US007009955B2

(12) United States Patent
Koo et al.

(10) Patent No.: US 7,009,955 B2
(45) Date of Patent: Mar. 7, 2006

(54) METHOD FOR OUTER LOOP POWER CONTROL TO COMPLY WITH QUALITY REQUIREMENTS OF ALL TRANSPORT CHANNELS WITHIN A CODED COMPOSITE TRANSPORT CHANNEL

(75) Inventors: Chang-Soo Koo, Melville, NY (US);
Sung-Hyuk Shin, Northvale, NJ (US);
Charles Dennean, Melville, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/900,160

(22) Filed: Jul. 27, 2004

(65) Prior Publication Data
US 2005/0025112 A1    Feb. 3, 2005

Related U.S. Application Data

(60) Provisional application No. 60/491,036, filed on Jul. 30, 2003.

(51) Int. Cl.
*H04B 7/216* (2006.01)
(52) U.S. Cl. .................. 370/335; 370/342; 370/441
(58) Field of Classification Search ............ 370/318, 370/328, 332, 333, 335, 342, 441; 455/67.11, 455/67.13, 69, 450, 522
See application file for complete search history.

(56) References Cited

U.S. PATENT DOCUMENTS

| 6,748,234 | B1 * | 6/2004 | Agrawal et al. ............ 455/522 |
|---|---|---|---|
| 2002/0003785 | A1 * | 1/2002 | Agin ........................... 370/333 |
| 2003/0036403 | A1 * | 2/2003 | Shiu et al. .................. 455/522 |
| 2003/0174686 | A1 * | 9/2003 | Willenegger et al. ....... 370/342 |
| 2004/0043783 | A1 * | 3/2004 | Anderson ................... 455/522 |
| 2004/0082301 | A1 * | 4/2004 | Agin ....................... 455/127.1 |
| 2004/0137860 | A1 * | 7/2004 | Oh et al. ................. 455/127.1 |
| 2004/0176096 | A1 * | 9/2004 | Agin ........................... 455/450 |
| 2004/0203457 | A1 * | 10/2004 | Rikola et al. ............ 455/67.13 |
| 2004/0203987 | A1 * | 10/2004 | Butala ........................ 455/522 |

* cited by examiner

*Primary Examiner*—Steven Nguyen
*Assistant Examiner*—Clemence Han
(74) *Attorney, Agent, or Firm*—Volpe and Koenig, P.C.

(57) ABSTRACT

A method for performing outer loop power control in a wireless communication system utilizing a plurality of transport channels begins by selecting an initial reference transport channel (TrCH) and a final reference TrCH. Outer loop power control is performed using the initial reference TrCH and then outer loop power control is performed using the final reference TrCH.

12 Claims, 4 Drawing Sheets

METHOD FOR OUTER LOOP POWER CONTROL TO COMPLY WITH QUALITY REQUIREMENTS OF ALL TRANSPORT CHANNELS WITHIN A CODED COMPOSITE TRANSPORT CHANNEL

CROSS REFERENCE TO RELATED APPLICATION(S)

This application claims the benefit of U.S. application Ser. No. 60/491,036, filed Jul. 30, 2003, which is incorporated by reference as if fully set forth herein.

FIELD OF INVENTION

The present invention relates to communication systems with power control algorithms, wherein the system has a coded composite transport channel (CCTrCH) with one or more transport channels (TrCHs) having required qualities of all TrCHs within the CCTrCH.

BACKGROUND

The third generation wideband code division multiple access (3G W-CDMA) systems use power control as a link adaptation method. Dynamic power control is applied for dedicated physical channels (DPCHs), such that the transmit power of the DPCHs is adjusted to achieve a quality of service (QoS) with a minimum transmit power level, thus limiting the interference level within the system. The transmit power control of DPCHs is typically divided into two processes operating in parallel: inner loop power control (ILPC) and outer loop power control (OLPC). The ILPC algorithm controls transmit power to keep the received signal to interference ratio (SIR) of each DPCH as close as possible to a target SIR. The OLPC algorithm controls the target SIR per coded composite transport channel (CCTrCH), to keep the received quality as close as possible to a target quality. In other words, the output of the OLPC is an updated target SIR used for the ILPC.

A CCTrCH can be composed of multiple transport channels (TrCHs) and the block error rate (BLER) of each TrCH is specified separately. All TrCHs within the CCTrCH are controlled simultaneously by a transmit power control (TPC) command of the ILPC. Therefore, the OLPC must select a target SIR value sufficient to meet all of the individual TrCH BLER requirements.

The OLPC algorithms would initially set a target SIR according to the required target quality for a given service, such as BLER, using a fixed mapping between BLER and SIR, assuming a most plausible channel condition. However, the actual mapping from a target BLER to a target SIR may vary by a large amount depending on the channel conditions, especially at very low BLER. The OLPC is typically implemented based on the cyclic redundancy check (CRC) for a reference TrCH. Because of this, it often takes a long time to converge to the required target SIR for the low BLER whenever the channel conditions vary significantly, leading to degrading the performance of the entire power control algorithm. Accordingly, the OLPC selects a TrCH with the highest BLER and the shortest transmission time interval (TTI) within the CCTrCH as the reference channel. This result allows the OLPC to quickly reach the steady state, because errors will occur more frequently, enabling corrections to be made faster.

The rate matching attributes could be selected such that all TrCHs within the CCTrCH are balanced with respect to the desired target BLER assuming a scenario of the channel conditions (e.g., the best case of additive white Gaussian noise (AWGN), a worst case of WG4 case 1, or the average of all channel conditions). However, the rate matching parameters required will change with the channel conditions. For example, as shown in FIG. 1, if the rate matching parameters are selected with respect to a best channel condition of the AWGN channel, then the worst case scenarios will not meet the BLER qualities for the non-reference TrCHs. Whereas, if the rate matching parameters are selected with respect to a worst case of WG4 case 1, the non-worst case scenarios will achieve better than necessary BLERs for the non-reference TrCHs, which implies a loss of capacity. Moreover, the wireless transmit/receive unit (WTRU) will generally not know the reference channel condition for the rate matching in the radio network controller (RNC).

It is desirable to select the reference TrCH to better achieve all target BLERs in differing channel conditions.

SUMMARY

A method for performing outer loop power control in a wireless communication system utilizing a plurality of transport channels begins by selecting an initial reference transport channel (TrCH) and a final reference TrCH. Outer loop power control is performed using the initial reference TrCH and then outer loop power control is performed using the final reference TrCH.

A method for performing power control on a multiplexed channel comprising a plurality of transport channels begins by receiving the multiplexed channel. A block error rate (BLER) for each transport channel (TrCH) of the received multiplexed channel is measured. The TrCH having a highest BLER is selected, and if more than one TrCH has the highest BLER, then selecting the TrCH with the highest BLER and the shortest transmission time. Power control using the selected TrCH is then performed.

BRIEF DESCRIPTION OF THE DRAWINGS

A more detailed understanding of the invention may be had from the following description of a preferred embodiment, given by way of example and to be understood in conjunction with the accompanying drawings, wherein.

DETAILED DESCRIPTION OF THE PREFERRED EMBODIMENTS

Hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, a Node B, a site controller, an access point, or any other type of interfacing device in a wireless environment.

The method of the present invention uses an outer loop power control (OLPC) algorithm to meet the required quality of service (QoS) of all the transport channels (TrCH) within a coded composite transport channel (CCTrCH) when the ability of rate matching is limited, although the method can be applied to a wireless system where multiple transport channels are multiplexed together prior to transmission. The method handles multi-service configurations through the selection and reselection of the reference channel, taking into account minimization of the initial convergence time and the requirement to ensure that all target block error rates (BLER) are achieved.

Figure 1:
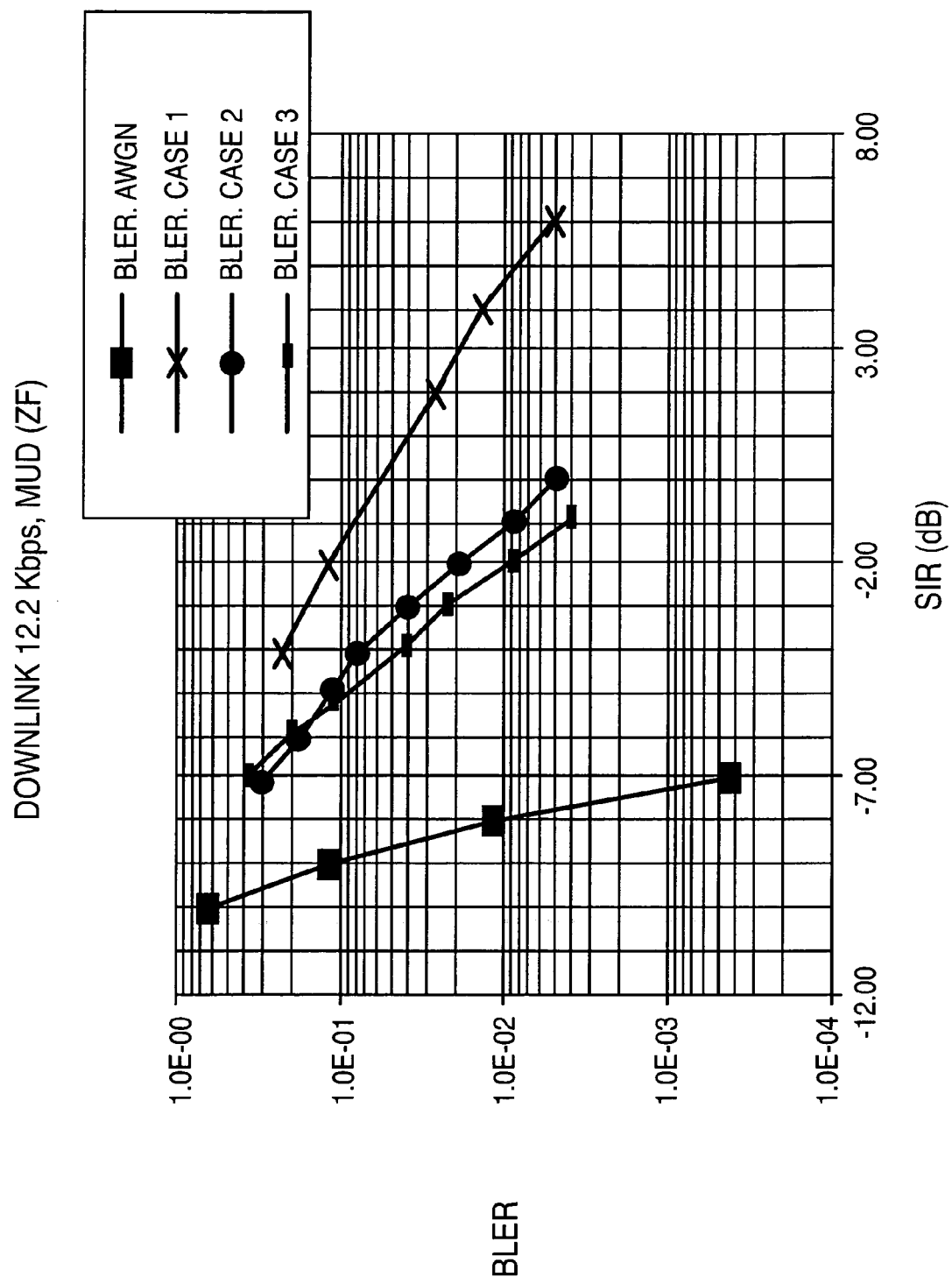
FIG. 1 is a graph of block error rate (BLER) versus signal to interference ratio (SIR) for various test cases.
Figure 2:
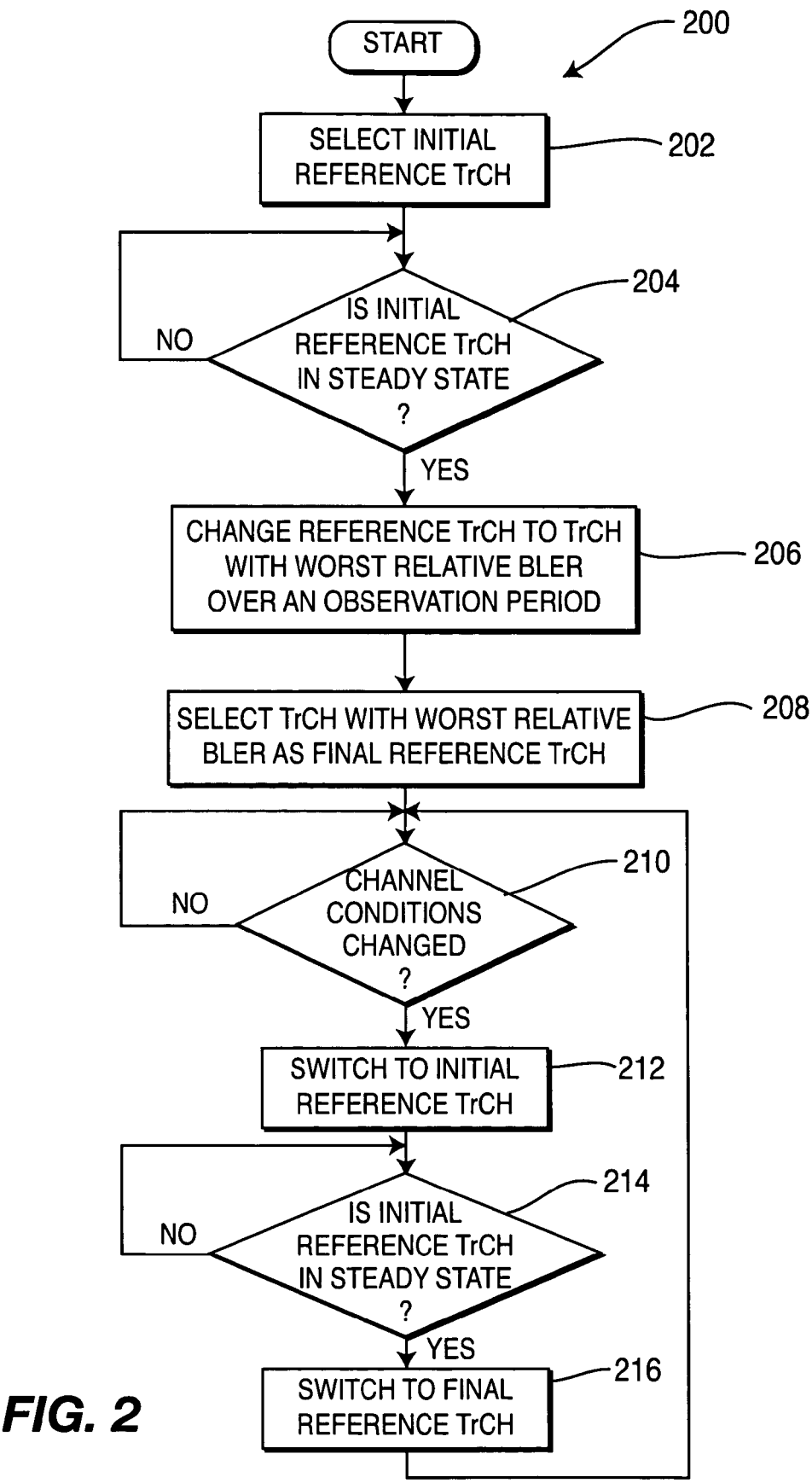
FIG. 2 is a flowchart of a method for achieving quality of service requirements for all TrCHs in a CCTrCH in accordance with the present invention.

FIG. 2 shows a flowchart of a method 200 for using OLPC to meet the QoS requirements in accordance with the present invention. The method 200 begins by selecting an initial reference TrCH (step 202). A determination is made whether the initial reference TrCH is in a steady state (step 204). When a TrCH is in a steady state, it means that the TrCH is meeting its BLER requirements. If the initial reference TrCH is not in a steady state, then the method 200 waits at step 204 until the initial reference TrCH is in a steady state. If the initial reference TrCH is in a steady state, then a new reference TrCH is selected, looking for the TrCH with the worst relative BLER over an observation period (step 206).

The relative BLER is defined as a ratio of the measured BLER to the required BLER. Only TrCHs which are not achieving their target BLER are considered. The method 200 repeats step 206 until the TrCH with the worst relative BLER within the CCTrCH is detected. The TrCH with the worst relative BLER within the CCTrCH is selected as the final reference TrCH (step 208). If the channel condition for the rate matching is known, then the final reference channel can be selected without the BLER measurement.

Next, a determination is made whether the channel conditions have changed (step 210). The target BLER is evaluated with respect to the final reference channel. The detection of a channel condition change is dependent upon the user algorithm employed. For example, user algorithms may include using the number of multipaths and amplitude variance of multipath. The simplest detection could be that if no CRC errors occur for a long period of time (i.e., the BLER is much lower than the target BLER), it means that the channel conditions have improved. If the channel conditions have not changed, then the method 200 waits at step 210 until the channel conditions do change. If the channel conditions have changed, then a switch is made to the initial reference TrCH (step 212). OLPC is then performed using the initial reference TrCH.

A determination is made whether the initial reference TrCH has returned to a steady state (step 214). If the initial reference TrCH has not returned to a steady state, then the method 200 waits at step 214 until the initial reference TrCH returns to a steady state. If the initial reference TrCH is in a steady state, then a switch is made to the final reference TrCH (step 216). OLPC is then performed using the final reference TrCH. The method 200 returns to step 210, to evaluate whether the channel conditions have changed. In the event that there is only one TrCH in the CCTrCH, the initial reference channel and the final reference channel are the same, i.e., there is no change in the reference channel.

Figure 3:
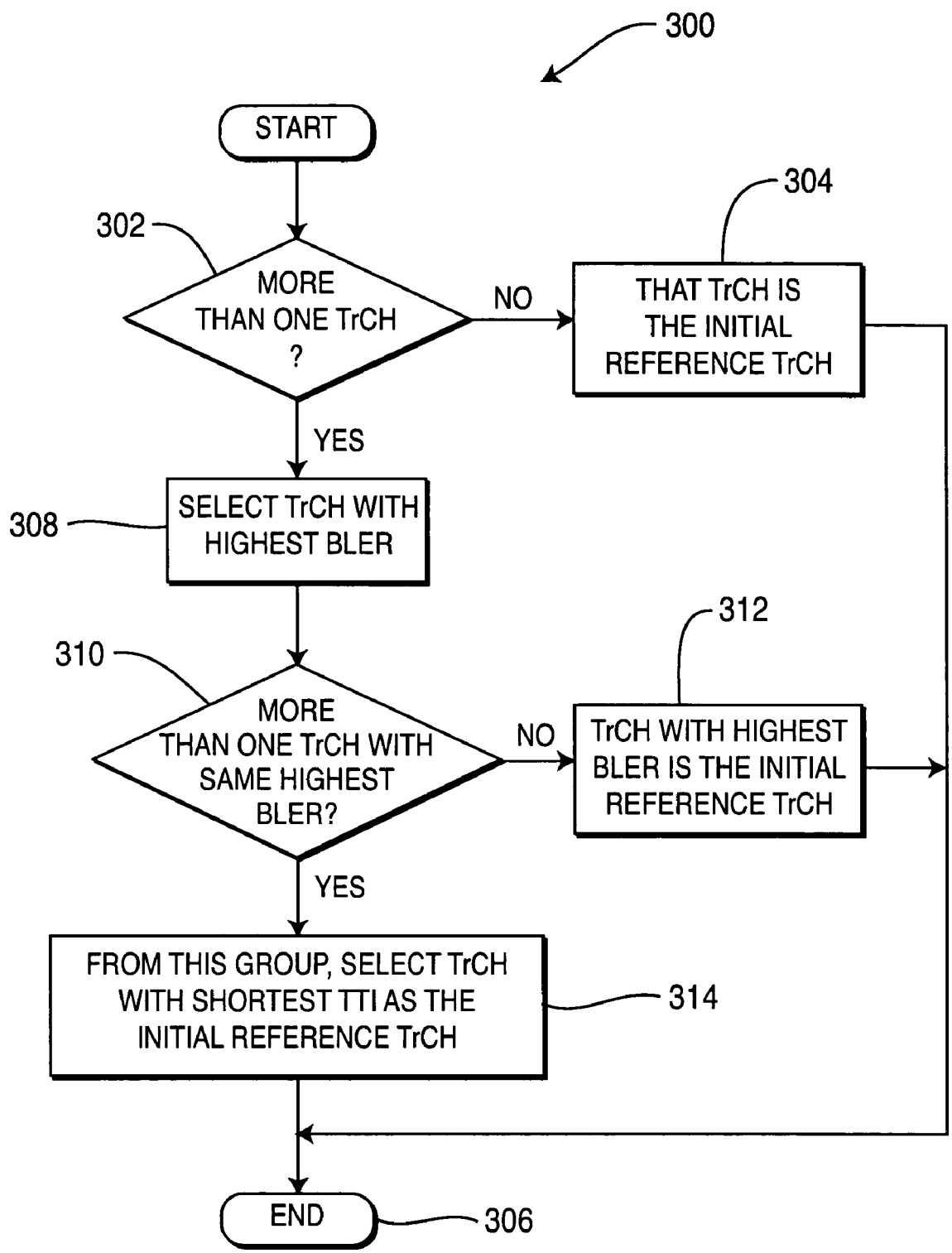
FIG. 3 is a flowchart of a method for selecting an initial reference TrCH.

FIG. 3 shows a flowchart of a method 300 for selecting an initial reference TrCH. The method 300 begins by determining whether there is more than one TrCH in the CCTrCH (step 302). If there is only one TrCH in the CCTrCH, then that TrCH is selected as the initial reference TrCH (step 304) and the method terminates (step 306). If there is more than one TrCH in the CCTrCH (step 302), then the TrCH with the highest BLER is selected (step 308). A determination is made whether there is more than one TrCH with the same highest BLER value (step 310). If there is only one TrCH with the highest BLER value, then that TrCH is selected as the initial reference TrCH (step 312) and the method terminates (step 306). If there is more than one TrCH with the same highest BLER (step 310), then the TrCH with the shortest TTI is selected as the initial reference TrCH (step 314) and the method terminates (step 306).

In the method 200, the initial reference TrCH selection method 300 is implemented without changing the reference TrCH afterward. Other approaches assume that the rate matching attributes are selected such that all TrCHs within the CCTrCH are balanced with respect to the desired target BLER. Therefore, if BLER for one TrCH is achieved, BLER for all other TrCHs within the CCTrCH will also be achieved. This permits the selection of any TrCH as the reference TrCH.

Figure 4:
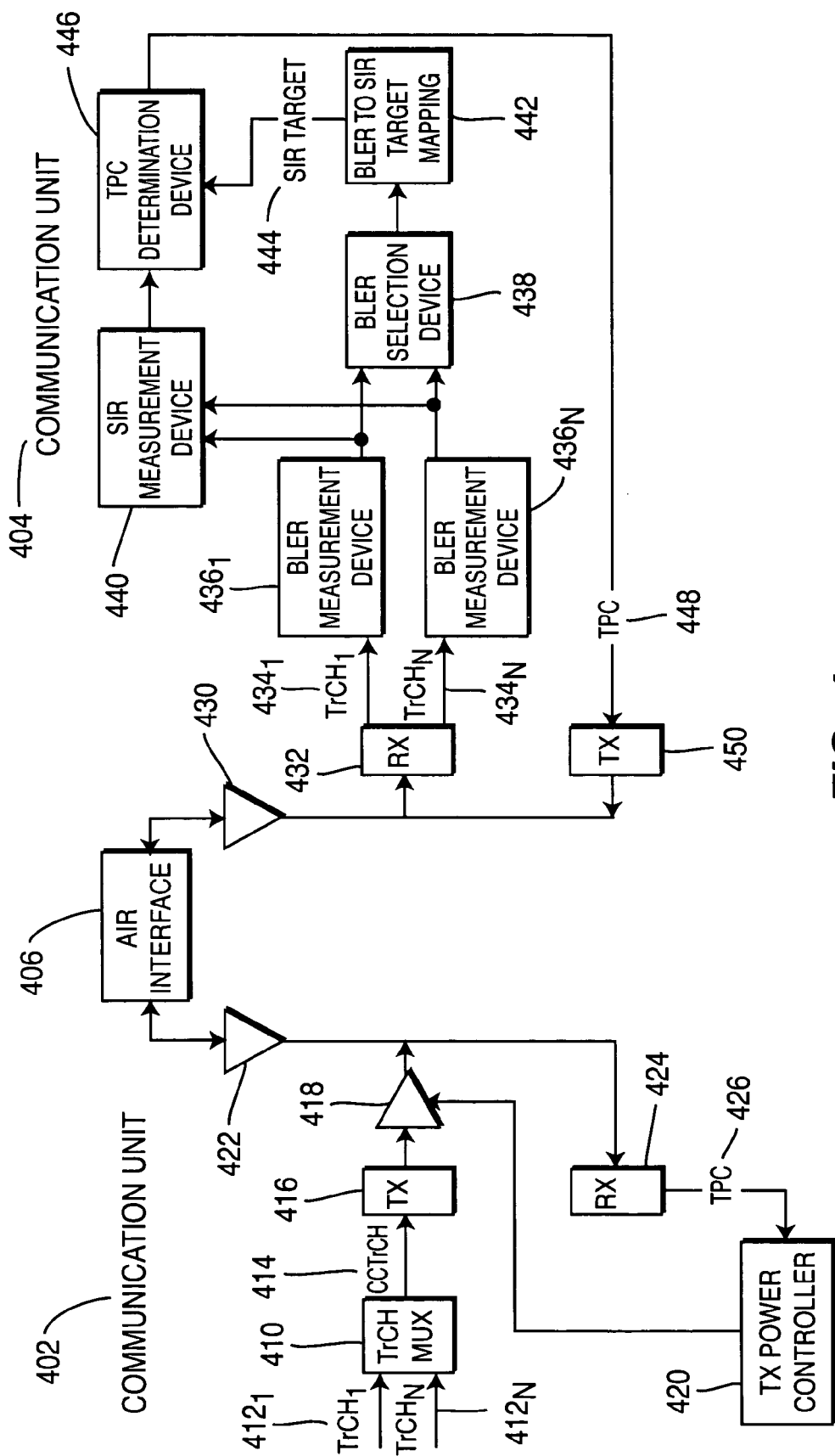
FIG. 4 is a block diagram of a system constructed in accordance with the present invention.

FIG. 4 shows a block diagram overview of a system 400 constructed in accordance with the present invention. The system 400 includes a first communication unit 402 communicating with a second communication unit 404 over an air interface 406. The first communication unit 402 includes a transport channel multiplexer 410, which accepts numerous TrCHs as inputs ($412_1$–$412_N$) and outputs a multiplexed CCTrCH 414. The CCTrCH 414 is passed to a transmitter 416 and then to an amplifier 418. A transmit power controller 420 controls the power of the amplifier 418 before the CCTrCH 414 is sent to the air interface 406 by an antenna 422. The first communication unit 402 also includes a receiver 424 for receiving signals over the air interface 406. One of the signals received by the receiver 424 is a transmit power control signal 426, which is used to control the transmit power controller 420.

The second communication unit 404 includes an antenna 430 for receiving and transmitting signals over the air interface 406. A receiver 432 receives a multiplexed CCTrCH and de-multiplexes it into individual TrCHs ($434_1$–$434_N$). Each TrCH is fed into a corresponding BLER measurement device ($436_1$–$436_N$), which measures the BLER of the TrCH. The measured BLERs are then passed to a BLER selection device 438 and a SIR measurement device 440. The BLER selection device 438 selects the highest BLER from the measured BLERs, and passes this value to a BLER to SIR target mapping device 442, which maps the highest BLER to a target SIR 444. The SIR target 444 is then passed to a TPC determination device 446. The SIR measurement device 440 measures the SIRs on each TrCH $434_1$–$434_N$ and forwards this information to the TPC determination device 446. The TPC determination device 446 uses both the measured SIRs and the SIR target 444 in determining the appropriate TPC command 448 which is sent to a transmitter 450 for transmission over the air interface 406 to the first communication unit 402.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for performing outer loop power control in a wireless communication system utilizing a plurality of transport channels, the method comprising the steps of:
   (a) selecting an initial reference transport channel (TrCH);
   (b) selecting a final reference TrCH;
   (c) performing outer loop power control using the initial reference TrCH;
   (d) performing outer loop power control using the final reference TrCH; and
   (e) determining whether channel conditions have changed; and
   (f) switching to the initial reference TrCH, the determining and switching steps being performed between steps (b) and (c).

2. The method according to claim 1, wherein the final reference TrCH is different from the initial reference TrCH.

3. The method according to claim 2, wherein the final reference TrCH is the TrCH with the worst relative block error rate (BLER).

4. The method according to claim 3, wherein the worst relative BLER is determined over an observation period.

5. The method according to claim 3, wherein only those TrCHs that are not achieving their BLER target are considered for the final reference TrCH.

6. The method according to claim 1, wherein step (a) includes the steps of:
   selecting a TrCH having a highest block error rate (BLER) as the initial reference TrCH; and
   if there is more than one TrCH with the highest BLER, then selecting the TrCH with the shortest transmission time interval as the initial reference TrCH.

7. A method for performing outer loop power control in a wireless communication system utilizing a plurality of transport channels, the method comprising the steps of:
   (a) selecting an initial reference transport channel (TrCH);
   (b) selecting a final reference TrCH;
   (c) performing outer loop power control using the initial reference TrCH;
   (d) performing outer loop power control using the final reference TrCH;
   (e) determining whether the initial reference TrCH is in a steady state; and
   (f) switching to the final reference TrCH, the determining and switching steps being performed between steps (c) and (d).

8. The method according to claim 7, wherein the final TrCH is different from the initial reference TrCH.

9. The method according to claim 8, wherein the final reference TrCH is the TrCH with the worst relative block error rate (BLER).

10. The method according to claim 9, wherein the worst relative BLER is determined over an observation period.

11. The method according to claim 9, wherein only those TrCHs that are not achieving their BLER target are considered for the final reference TrCH.

12. The method according to claim 7, wherein step (a) includes the steps of:
    selecting a TrCH having a highest block error rate (BLER) as the initial TrCH; and
    if there is more than one TrCH with the highest BLER, then selecting the TrCH with the shortest transmission time interval as the initial TrCH.

* * * * *